US008682965B2

(12) United States Patent
Sugaya

(10) Patent No.: US 8,682,965 B2
(45) Date of Patent: Mar. 25, 2014

(54) REMOTE SUPPORT SYSTEM AND REMOTE SUPPORT METHOD FOR TERMINAL

(75) Inventor: Shunji Sugaya, Tokyo (JP)

(73) Assignee: OPTiM Corporation, Saga (JP)

( * ) Notice: Subject to any disclaimer, the term of this patent is extended or adjusted under 35 U.S.C. 154(b) by 144 days.

(21) Appl. No.: 13/156,896

(22) Filed: Jun. 9, 2011

(65) Prior Publication Data

US 2012/0233244 A1    Sep. 13, 2012

(30) Foreign Application Priority Data

Mar. 10, 2011   (JP) .................................. 2011-052949

(51) Int. Cl.
 *G06F 15/16* (2006.01)
(52) U.S. Cl.
 USPC ......................................... 709/203; 709/219
(58) Field of Classification Search
 USPC ........................................................ 709/217
 See application file for complete search history.

(56) References Cited

U.S. PATENT DOCUMENTS

2008/0224915 A1 * 9/2008 Unger et al. .................. 341/176
2009/0077215 A1 * 3/2009 Jayanthi ....................... 709/223
2011/0150267 A1 * 6/2011 Snelling et al. ............... 382/100

FOREIGN PATENT DOCUMENTS

JP          2003006062 A      1/2003

* cited by examiner

*Primary Examiner* — Shaq Taha
(74) *Attorney, Agent, or Firm* — BainwoodHuang

(57) ABSTRACT

A remote system and a remote operation method are provided, being capable of starting promptly and completing remote operation immediately for a user. A support server 100 acquires configuration information of a user terminal 10 in response to support request from the user terminal 10, receives remote operation from a supporter, the operation corresponding to support request sent from a support terminal 150, and sends remote operation received from the supporter to the user terminal 10 as a configuration command for setting configuration corresponding to the support request from the user terminal 10. The user terminal 10 sets configuration corresponding to the support request based on sent configuration command. Where the user terminal 10 conducts configuration corresponding to the support request based on the sent configuration command, the user terminal 10 displays a user interface in a phased manner to set the configuration corresponding to remote request.

9 Claims, 8 Drawing Sheets

Fig.4

<CONFIGURATION COMMAND CORRESPONDENCE TABLE>

| CONFIGURATION OPERATION | CONFIGURATION COMMAND | PHASE DISPLAY DATA |
|---|---|---|
| [VOLUME CHANGE OPERATION] RING VOLUME CHANGE OPERATION Volume 15 | [RING VOLUME CHANGE COMMAND 1] import CallSound.cfg copy CallSoundnew.cfg | [RING VOLUME CHANGE SCENARIO 1] 1. DISPLAY CONFIGURATION WINDOW 2. SELECT SOUND CONFIGURATION |
| : | : | : |

Fig. 5

<PHASE DISPLAY PROCESS OF USER INTERFACE>

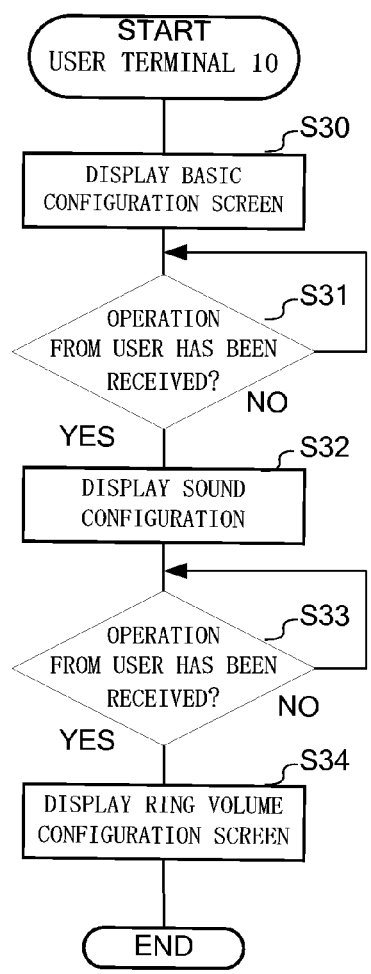

Fig.9
<SCREEN INFORMATION ANALYTICAL PROCESS>
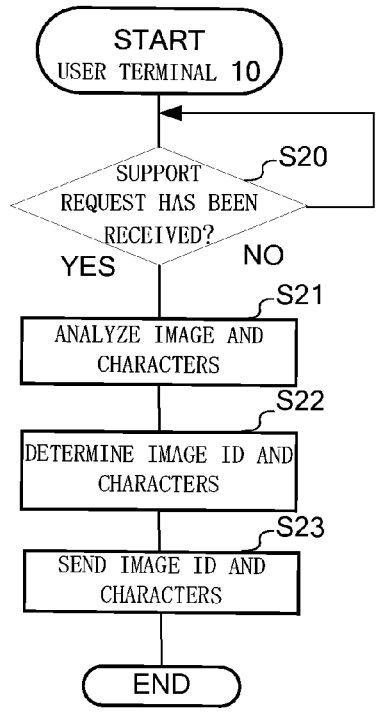
Fig.10
<IMAGE ID CORRESPONDENCE TABLE>
Fig.11
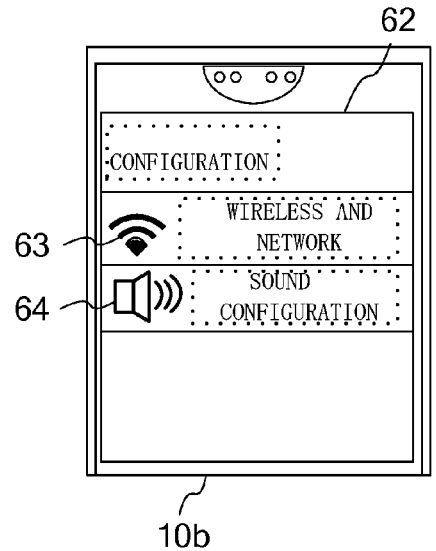

<IMAGE ID-CHARACTER STRING CORRESPONDENCE TABLE>

| IMAGE ID | CHARACTERS | CORRESPONDENCE IMAGE DATA |
|---|---|---|
| 001 002 | [CONFIGURATION][WIRELESS AND NETWORK][SOUND CONFIGRATION] | Sound1.png |
| 002 | [SOUND CONFIGURATION][MANNER MODE] [VIBRATE MODE] | Sound2.png |
| 001 | [WIRELESS AND NETWORK] [SSID] | Network1.png |
| : | : | : |

<ICON IMAGE ACQUISITION-SET-IN PROCESS>

REMOTE SUPPORT SYSTEM AND REMOTE SUPPORT METHOD FOR TERMINAL

This application is based on and claims the benefit of priority from Japanese Patent Application No. 2011-052949, filed on 10 Mar. 2011, the content of which is incorporated herein by reference.

TECHNICAL FIELD

The present invention relates to a remote support system and a remote support method that remotely support a user's terminal connected through a public line network.

BACKGROUND ART

In recent years, various services have been provided for users by connecting portable terminals connected with a web server and the like through a public line network. In particular, advanced services, which have been provided for personal computers conventionally, has become possible to provide for mobile phones by the appearance of smart phones (highly functional mobile phones).

In addition to services provided from servers, smart phones themselves have various functions. However, it often takes time for users to become familiar with all the functions. For example, even if a smart phone has functions as a user desires, the problem where the user cannot utilize the functions has been presented because the user is not sure how to set up the functions.

Then, in order to maximize the use of such advanced web services and the high functionality of a smart phone, users need to know the operation of configuration and the functions of a smart phone. In addition, if users who are not used to operation configuring their own terminals for the first time, configuration information that should not be deleted may be actually deleted, or inappropriate configuration may be set to cause an error.

For approaching such problems, there has been a known method of remotely supporting (maintaining) a user's terminal from a system to remotely configure the user's terminal and to remotely guide the user of the terminal. For example, the patent document 1 discloses that a server side requires the screen information of each client to be supported and constantly displays a list of this screen information on the server to promote the efficiency of supporting and monitoring a client.

CITATION LIST PATENT LITERATURE

Patent document 1: Japanese Unexamined Patent Application 2003-006062

For smooth support, a command for setting configuration as a user desires may be sent from a support terminal to a user terminal to set the client's configurations from the support side. For example, when a user cannot set a predetermined ring tone in the sound configuration, a configuration command for setting a predetermined ring tone may be sent from a server to a user terminal so as to complete configuration.

However, the method of setting a configuration by merely sending such a configuration command from a server to a user terminal leads the configuration to be set without user's awareness of the operation method of setting configuration. In this case, the user may not be able to set the configuration by her or himself, when the user attempts to set a similar configuration again. Furthermore, multiple phased operations may be required to reach only one configuration to a user terminal. In this case, the user has to understand all of these phased operations to complete configuration.

SUMMARY OF INVENTION

An object of the present invention is to provide a remote system and a support method enabling a user who receives remote operation to learn steps received through remote operation, in the remote operation of a user's terminal.

According to a first aspect of the present invention, a remote system includes: a terminal; a remote terminal remotely operating the terminal; and a remote server. In the remote system, the remote server includes a data acquisition module acquiring data in response to remote request from the terminal, the data being stored in the terminal, and notifying the remote terminal, the remote terminal includes an operation receiving module receiving remote operation from a remote operator, the remote operation corresponding to remote request sent from the terminal, and sending the remote operation to the remote server.

The remote server also includes a command sending module sending operation received from the remote operator to the terminal, as a command for conducting operation corresponding to remote request from the terminal, and the terminal includes a phase display module displaying, where remote operator's operation corresponding to the remote request is reflected in the terminal based on a command sent from the command sending module, a user interface to help a user who operates the terminal to conduct operation corresponding to the remote request by her or himself, in a phased manner on the terminal.

According to the first aspect of the present invention, the remote server acquiring data in response to remote request from the terminal, the data being stored in the terminal, and the remote terminal receives operation from a remote operator, the operation corresponding to remote request sent from the terminal. The remote server also sends operation received from the remote operator to the terminal, as a command for conducting operation corresponding to remote request from the terminal. The terminal displays a user interface to help a user who operates the terminal to conduct operation corresponding to the remote request by her or himself, in a phased manner on the terminal, where remote operator's operation corresponding to the remote request is reflected in the terminal based on this sent command.

Therefore, the remote server receives remote request from the terminal, complete reflect the remotely requested operation by a command corresponding to this remote request, displays a user interface in a phased manner for setting this configuration the terminal, thereby enabling a user who operates the terminal to learn how to conduct the remotely requested operation.

According to the second aspect of the present invention, in the remote system according to the first aspect of the present invention, the remote server includes a screen information acquisition module acquiring at least any one of an image ID and a character string from the terminal, the image ID and the character string, both corresponding to screen information of the terminal; and a terminal information output module displaying an image corresponding to any one of the acquired image ID and the acquired character string on the remote terminal.

According to the second aspect of the present invention, the remote server acquires at least any one of an image ID and a character string from the terminal, the image ID and the character string, both corresponding to screen information of the terminal and displays an image corresponding to at least any one of the acquired image ID and the acquired character string on the remote terminal.

Therefore, the remote server can display screen information of the terminal on the remote terminal. In this case, the screen information itself of the terminal is not sent and received, but display process of a correspondence image is executed with an image ID and a character string that have been sent and received. This leads data traffic between the terminal and the remote server to be reduced so that support time loss can be avoided. Even in the situation of this reduced data traffic, a remote operator can check whether or not the phase display of a user interface that has been displayed on the terminal in a phased manner is performed on the remote terminal side.

According to a third aspect of the present invention, a support system includes: a terminal; a support terminal supporting the terminal; and a support server. In the support system, the support server includes a configuration information acquisition module acquiring software or hardware configuration information on the terminal in response to support request from the terminal, the support terminal includes an configuration operation receiving module receiving operation from a supporter, the operation corresponding to remote request sent from the terminal.

The support server also includes a command sending module sending operation received from the supporter to the terminal, as a configuration command for setting configuration corresponding to support request from the terminal, and the terminal includes a configuration phase display module displaying a user interface to set configuration corresponding to the remote request in a phased manner on the terminal, where configuration corresponding to the support request is conducted based on a configuration command sent from the command sending module.

According to the third aspect of the present invention, the support server acquires software or hardware configuration information on the terminal in response to a support request from the terminal, and the support terminal receives operation from a supporter, the operation corresponding to remote request sent from the terminal. The support server also sends operation received from the supporter to the terminal, as a configuration command for setting configuration corresponding to support request from the terminal. Accordingly, the terminal displays a user interface to set configuration corresponding to the remote request in a phased manner on the terminal, where configuration corresponding to the support request is conducted based on the sent configuration command.

Therefore, the support server receives support request from the terminal, sends configuration command for setting configuration corresponding to this support request to set configuration of the terminal, and displays a user interface for setting this configuration in a phased manner on the terminal, thereby enabling a user who configures the terminal to learn how to set the configuration.

In categories of the invention, not only a system but also a method has functions and effects similar to those according to the third aspect of the present invention.

According to a fourth aspect of the present invention, in the support system according to the third aspect of the present invention, the support server includes a screen information acquisition module acquiring at least any one of an image ID and a character string from the terminal, an image ID and a character string, both corresponding to a display screen of the terminal, and a terminal information output module displaying a display screen corresponding to the configuration information, the acquired image ID, and the acquired character string on the support terminal.

According to the fourth aspect of the present invention, the support server acquires at least any one of an image ID and a character string from the terminal, the image ID and the character string, both corresponding to screen information of the terminal, and displays an image corresponding to at least any one of the acquired image ID and the acquired character string on the support terminal.

Therefore, the support server can display screen information of the terminal on the support terminal. In this case, the screen information itself of the terminal is not sent and received, but display process of a correspondence image is executed with an image ID and a character string that have been sent and received. This leads data traffic between the terminal and the support server to be reduced so that support time loss can be avoided. Even in the situation of this reduced data traffic, a supporter can check whether or not the phase display of a user interface that has been displayed on the terminal in a phased manner is performed on the support terminal side.

According to a fifth aspect of the present invention, in the support system according to the third aspect of the present invention, the configuration phase display module includes a redisplay module redisplaying the user interface that was displayed in a phased manner in response to user's operation of the terminal.

Accordingly, a user who owns a terminal can redisplay the user interface that was displayed in a phased manner before.

According to the present invention, the remote system can provide a remote system and a support method enabling a user who receives remote operation to learn steps received through the remote operation in the remote operation of a user's terminal.

BRIEF DESCRIPTION OF DRAWINGS

FIG. 4 illustrates a configuration command correspondence table;

FIG. 5 is a flow chart diagram illustrating the user interface phase display process that is executed by the user terminal 10;

FIG. 9 is a flow chart diagram illustrating a screen information analytical process that is executed by the user terminal 10;

FIG. 10 illustrates an image ID correspondence table;

FIG. 11 illustrates screen information displayed on the user terminal 10;

DESCRIPTION OF EMBODIMENTS

Hereinafter, a best mode of the present invention will be described with reference to attached drawings. However, this is illustrative only, and the scope of the present invention is not limited thereto.

An example of applying a quick remote system to a remote support system will be explained hereinafter as a preferred embodiment of the present invention. In the present invention, an example where remote operation of a user terminal 10 is used for remote support to the user terminal 10 will be explained. Generally, the support server as described hereinafter may be a remote server. The support terminal may be a remote terminal. The configuration command as described hereinafter may be a general command which is not limited to any configuration. Generally, the support request may be a remote request.

Quick System Configuration

Figure 1:
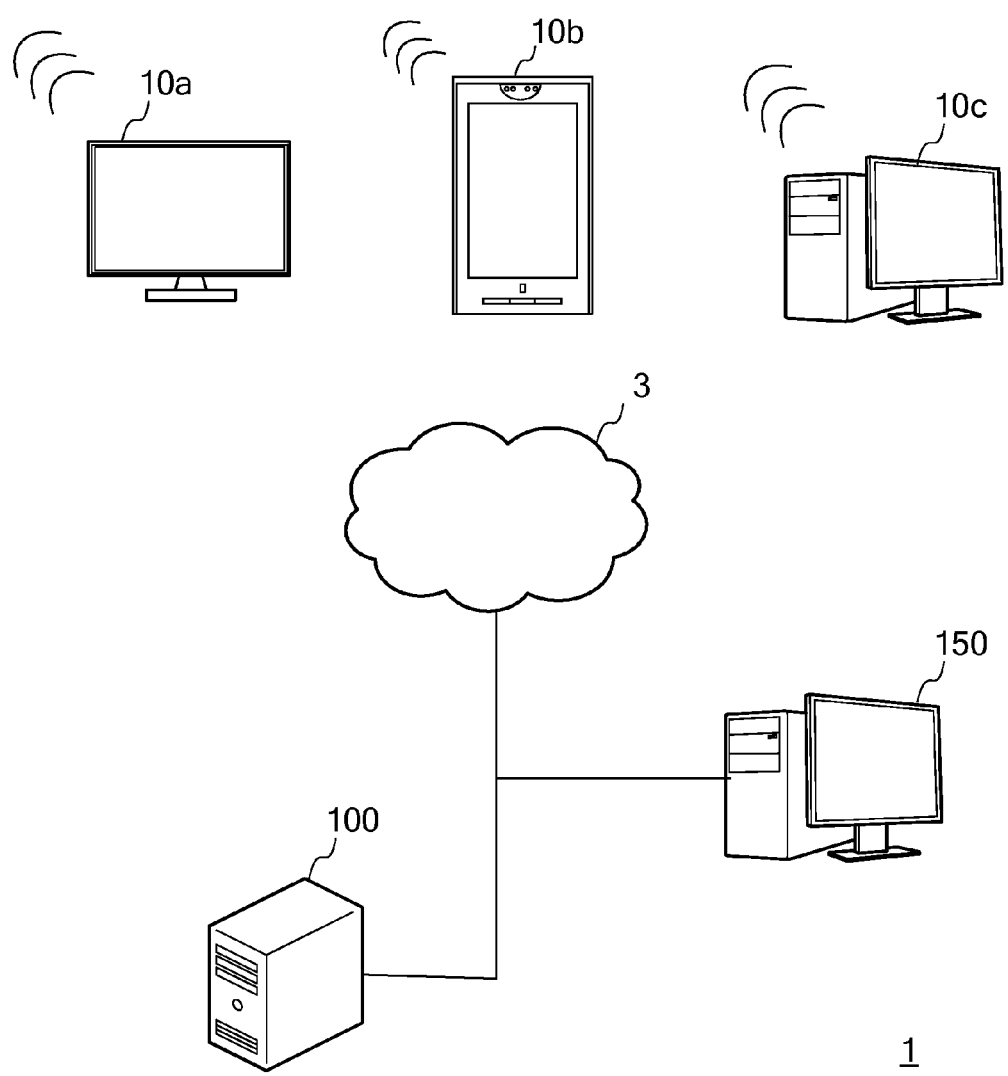
FIG. 1 is a schematic diagram of a quick remote system 1.

FIG. 1 is a system configuration diagram of a quick remote system 1 that is a preferred embodiment of the present invention. The quick remote system 1 is composed of user terminals 10a-10c (hereinafter simply put "a user terminal 10" in the place of "user terminals 10a-10c"), a support server 100, a public line network 3 (such as Internet networks, a third generation communication network, and a fourth generation communication network), and a support terminal 150.

The user terminal 10 is communicatably connected with the support server 100 through the public line network 3. The support server 100 and the support terminal 150 may be connected through a local area network (hereinafter referred to as "LAN") or through the public line network 3. The communication in the quick remote system 1 may not be wireless communication nor wire communication. The user terminal 10 may be communicatably connected with the public line network 3 through a network device such as a router.

The user terminal 10 may be a general information terminal for which a user receives support, which is an information device or an electrical appliance with functions described hereinafter. For example, the user terminal 10 may be a mobile phone, a smart phone 10b, a complex printer, a television 10a, networking equipment such as a router or a gateway, and a computer 10c. The user terminal 10 may also be white goods such as a refrigerator and a washing machine. The user terminal 10 may also be general information appliances such as a telephone, a netbook terminal, a slate terminal, an electronic book terminal, an electronic dictionary terminal, a portable music player, and a portable player capable of recording and playing back content.

The support terminal 150 is a general information terminal that is used by a supporter to support the user terminal 10.

Generally, the support terminal 150 shares a screen with the user terminal 10 in real time and conducts remote operation in order to conduct the remote support. Specifically, screen information, which becomes a screen shot that is being displayed on the user terminal 10, is displayed on the support terminal 150. The remote operation of this screen information from the support terminal 150 is reflected directly in the user terminal 10. This remote system corresponds to the full remote system as describes hereinafter. However, the quick remote system 1 (hereinafter conveniently referred to as "quick remote") is the remote system that does not conduct remote operation in real time by screen sharing.

Functions

Figure 2:
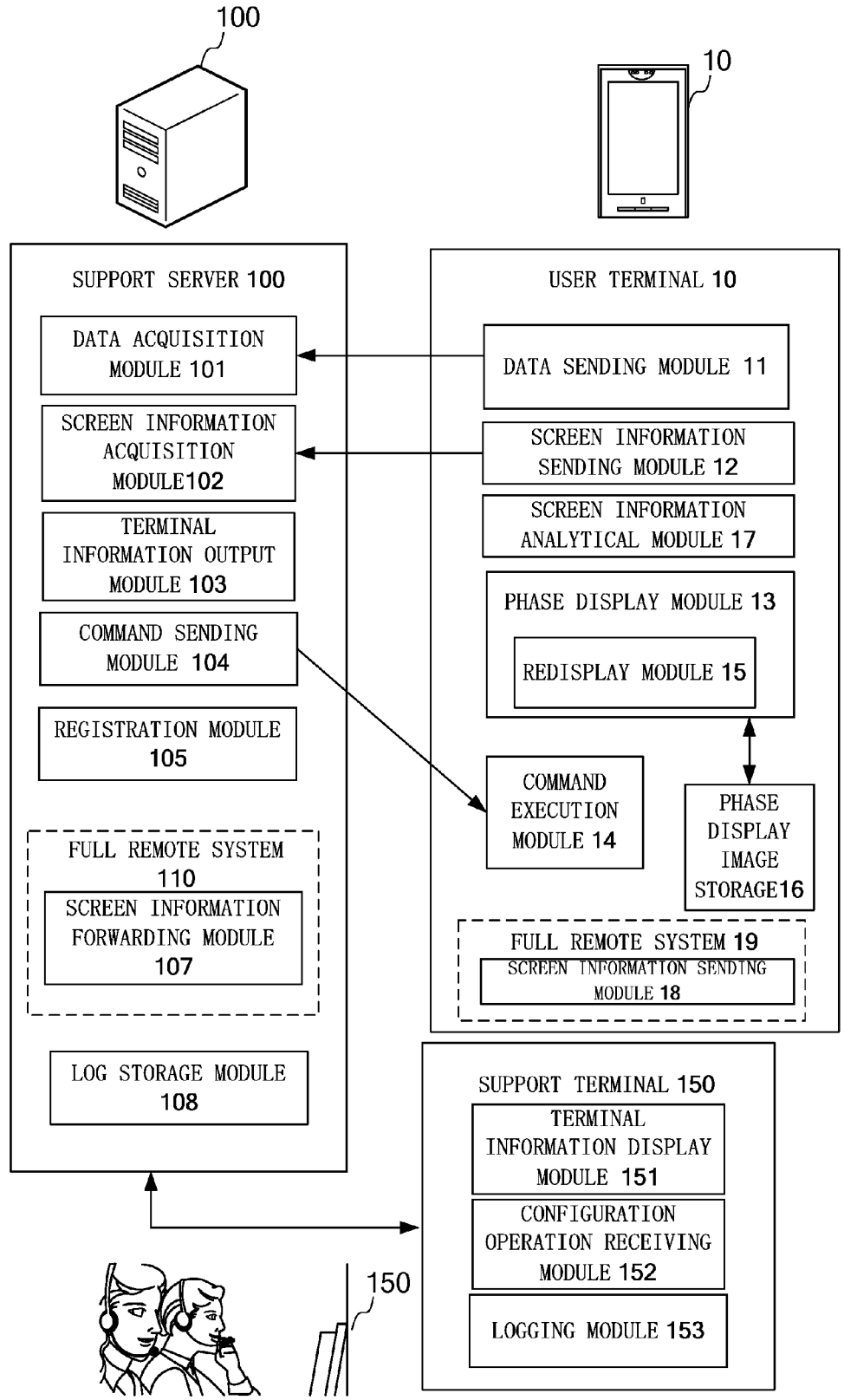
FIG. 2 is a functional block diagram of a support server 100, a user terminal 10, and a support terminal 150.

FIG. 2 illustrates the relationship among the respective functions of a support terminal 150, a support server 100, and a user terminal 10.

The user terminal 10 and the support terminal 150 include a control unit including a central processing unit (hereinafter referred to as "CPU"), a random access memory (hereinafter referred to as "RAM"), and a read only memory (hereinafter referred to as "ROM"), and the like; and a communication unit including Wireless Fidelity® or WiFi® enabled device complying with, for example, IEEE802.11, a wireless device complying with the IMT-2000 standard such as the third generation mobile communication system, or the like. The communication unit may include a wired device for LAN connection.

The user terminal 10 and the support terminal 150 also include a display unit outputting and displaying data and images that have been controlled by the control unit as an output unit; and a touch panel, a keyboard, a mouse, and the like that receive input from a user and a supporter as an input unit. The user terminal 10 and the support terminal 150 also include a data storage unit as a memory unit such as a hard disk or a semiconductor memory.

In the user terminal 10, the control unit cooperates with the communication unit, the output unit, the input unit, and the memory unit by reading a predetermined program of an application layer to achieve a data sending module 11, a screen information sending module 12, a phase display module 13, a command execution module 14, a redisplay module 15, and a screen information analytical module 17. A part of the memory unit of the user terminal 10 achieves phase display image storage 16. The specific function of each module will be described with reference to FIG. 3.

In the support terminal 150, the control unit reads a predetermined program of a predetermined application layer and cooperates with the communication unit, the output unit, the input unit, and the memory unit to achieve a terminal information display module 151 and a configuration operation receiving module 152. The specific function of each module will be described with reference to FIG. 3.

The support server 100 includes a control unit including a central processing unit (hereinafter referred to as "CPU"), a random access memory (hereinafter referred to as "RAM"), and a read only memory (hereinafter referred to as "ROM"), and the like; and a communication unit including Wireless Fidelity® or WiFi® enabled device complying with, for example, IEEE802.11. The support server 100 also includes a data storage unit as a memory unit such as a hard disk or a semiconductor memory.

The control unit of the support server 100 cooperates with the communication unit and the memory unit by reading a predetermined program of a predetermined application layer to achieve a data acquisition module 101, a screen information acquisition module 102, a terminal information output module 103, a command sending module 104, a registration module 105, and a logging module 108. The function of each of these modules will be described hereinafter.

Remote Support Process

Figure 3:
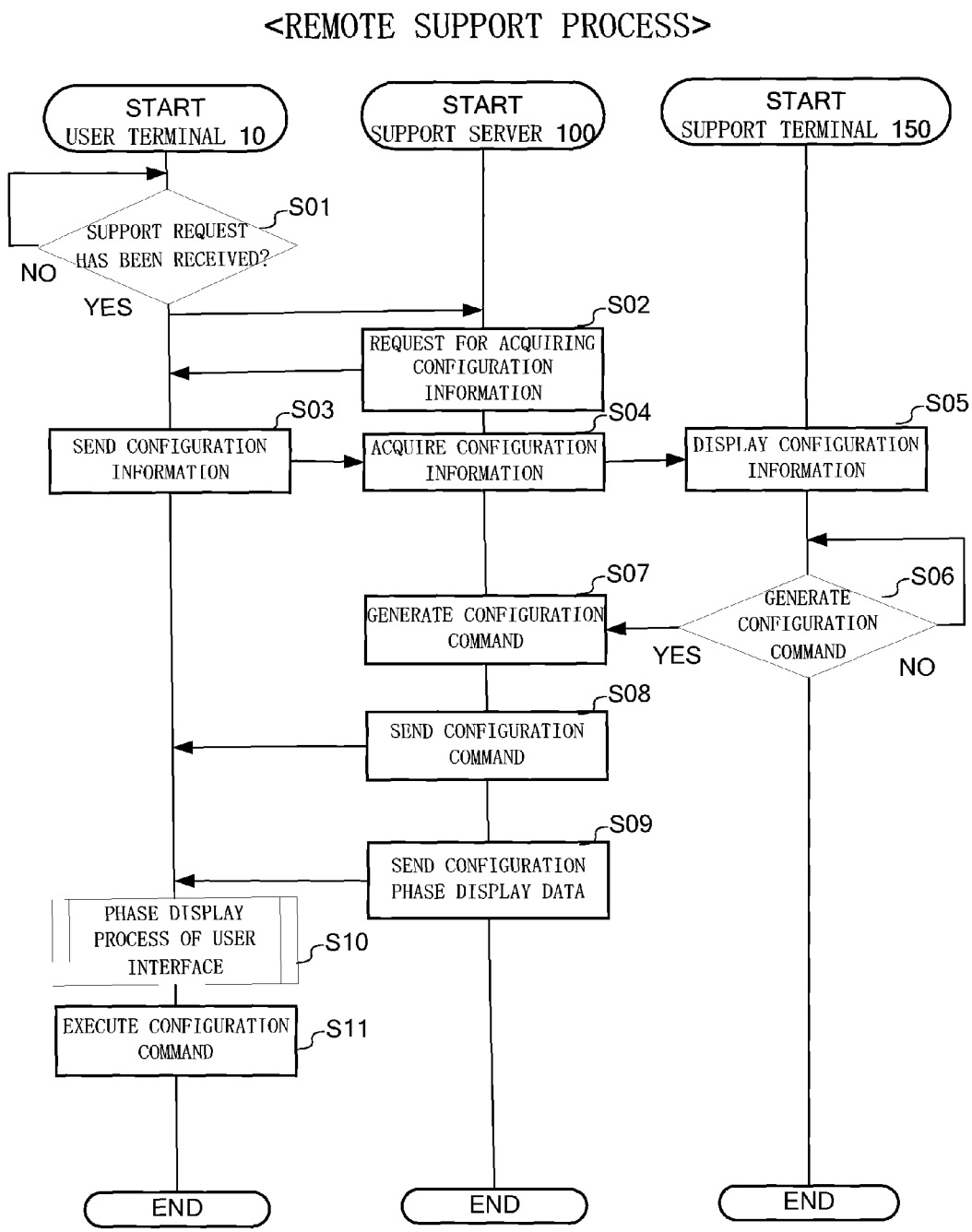
FIG. 3 is a flow chart diagram illustrating a remote support process that is executed by the support server 100, the user terminal 10, and the support terminal 150.

FIG. 3 is a flow chart diagram of a remote support process that is executed by the user terminal 10, the support server 100, and the support terminal 150.

The user terminal 10 receives operation that a user requested for support (Step S01). In the user terminal 10, an application for receiving remote support is installed and for example, receives operation for starting this application from a user.

If the user terminal 10 receives operation that a user requested for support (Step S01: "Yes"), the user terminal 10 connects with the support server 100, notifies the support server 100 of support request, and proceeds to the step S02. If the user terminal 10 does not receives operation that a user requested for support (Step S01: "NO"), the step S01 is repeated.

Next, the data acquisition module 101 of the support server 100 requests to acquire the configuration information of the user terminal 10 (Step S02).

Figure 6:
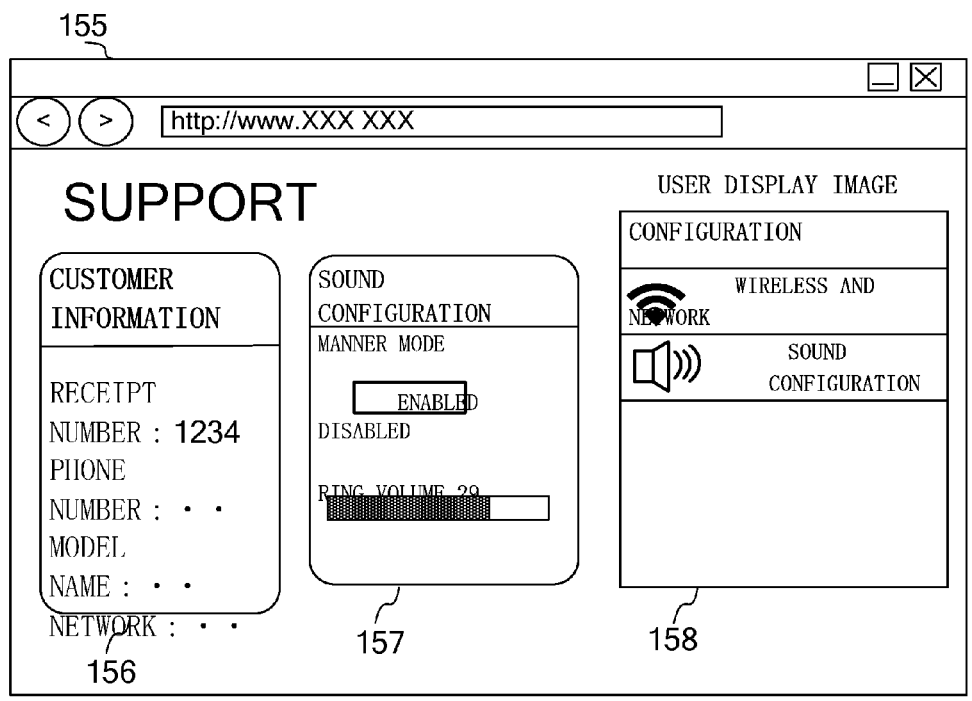
FIG. 6 illustrates a screen image displayed on the support terminal 150.

The configuration information is data that is set as data in the user terminal 10 as software and hardware. The support server 100 does not need to request for acquiring all the configuration information stored in the user terminal 10. The configuration information acquired by the support server 100 may be predetermined in the support server 100 with respect to each user terminal 10. As one example of configuration information that is set as software shown in FIG. 6, in the support screen 155 displayed on the support terminal 150, the manner mode of the sound configuration is enabled, and the ring volume is set to "29." In addition to configuration information, the support server may request for acquiring customer information (a telephone number, the model name of a terminal, and a network) as shown in FIG. 6.

In response to this request, the data sending module 11 of the user terminal 10 sends the required configuration information to the support server 100 (Step S03).

The data acquisition module 101 of the support server 100 receives and acquires the configuration information sent from the user terminal 10 (Step S04). The support server 100 selects a support terminal 150 to notify the selected support terminal 150 that support request has been received and that the configuration information of the user terminal 10 has been acquired.

In response to this notification, the terminal information display module 151 of the selected support terminal 150 accesses the support server 100 in response to operation from a supporter. Then, the terminal information output module 103 of the support server 100 displays the configuration information on the support terminal 150 (Step S05). As one example, the support screen 155 shown in FIG. 6 is displayed on the support terminal 150.

Next, the configuration operation receiving module 152 of the support terminal 150 receives configuration operation (remote operation) from a supporter (Step S06). The configuration operation is to be a solution to support request of a user. If configuration operation is received from a supporter (Step S06: "YES"), the configuration operation is sent to support server 100, and the process proceeds to the step S07. If a configuration operation is not received from a supporter (Step S06: "NO"), the process waits for input from a supporter, and the step S06 is repeated.

When the command sending module 104 of the support server 100 receives configuration operation from the support terminal 150, generates a configuration command corresponding to the configuration operation (Step S07), and sends the generated configuration command to the user terminal 10 (Step S08). Then, the process proceeds to the step S09.

The configuration command is a command for making the support server 100 set configuration requested for support in the user terminal 10. For example, when the sound configuration of the user terminal 10 is set, being written in a predetermined configuration file, the sound configuration is changed by updating this configuration file to configuration as a user desires. In this case, the support server 100 sends a predetermined command to replace the configuration file stored in the user terminal 10 or to change the content of the configuration file. This sent predetermined command is the configuration command.

As shown in the configuration command correspondence table of FIG. 4, configuration operation received from the support terminal 150 and a configuration command to be generated are preliminarily associated and stored in the support server 100. The configuration command may be a command in the configuration command correspondence table. The configuration command may be generated, including a character and values that are input from the support terminal 150 in the configuration command correspondence table. In the example of FIG. 4, the configuration operation is "VOLUME CHANGE OPERATION" to set the ring volume "Volume 15". In this case, the correspondence configuration command is the ring volume command 1.

Next, the support server 100 sends the configuration phase display data to the user terminal 10 (Step S09). The phase display module 13 of the user terminal 10 receives the configuration phase display data sent from the support server 100, stores the received configuration phase display data in the phase display image storage 16, and executes the user interface phase display process (Step S10).

The configuration phase display data is data on a user interface that is displayed on the user terminal 10 in a phased manner when a user operates the user terminal 10 to set configuration requested for support by her or himself. In other words, the configuration phase display data is composed of scenario data that displays this user interface on the user terminal 10 in a phased manner; and a command for executing this scenario data.

The scenario data is data that defines an agreement: in order to operate the user terminal 10 by her or himself to set configuration that a user requested for support, which user interface is displayed in which order, and what operation shifts to the next user interface on the user terminal 10. In the example of FIG. 4, the configuration phase display data is the ring volume scenario 1, in which a configuration window is displayed first, and then sound configuration is selected and displayed, and the like. The configuration phase display data includes a command for making the user terminal 10 execute this scenario data.

The configuration phase display data is preliminarily associated with configuration operation and a configuration command as shown in the configuration command correspondence table of FIG. 4. Accordingly, the support server 100 determines the configuration phase display data if the configuration operation and the configuration command are determined. In the example of FIG. 4, the configuration phase display data corresponding to the configuration command "ring volume command 1" is "ring volume scenario 1.

Next, the command execution module 14 of the user terminal 10 executes the configuration command received from the support server 100 (Step S11). In other words, the command execution module 14 can actually set the configuration item requested for support by executing a configuration command received from the support server 100. In the example of FIG. 4, the ring volume of the user terminal 10 can be set to "Volume 15".

Therefore, in the quick remote system 1, it is possible to promptly conduct remote operation from the support terminal 150 not by processing operation data on remote operation itself through remote login or the like but by using a command corresponding to remote operation.

Phase Display Process of User Interface

Figure 7:
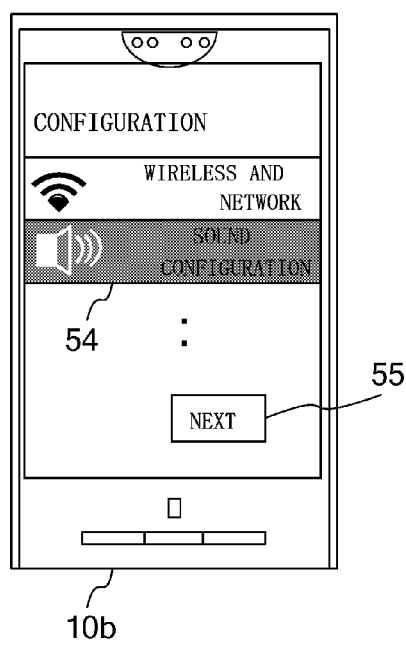
FIG. 7 is a screen image (basic configuration setup screen) displayed on the user terminal 10.
Figure 8:
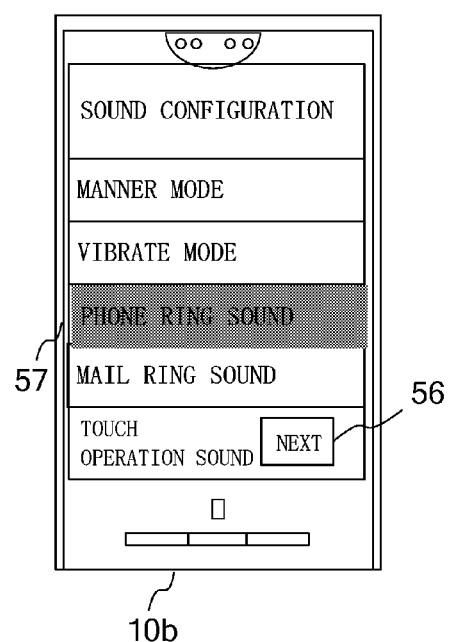
FIG. 8 is a screen image (sound setup screen) displayed on the user terminal 10.

Based on FIGS. 5, 7, and 8, the phase display process of a user interface that is executed by the phase display module 13 of the user terminal 10 and corresponds to the step S10. The phase display module 13 displays a message on the display unit of the user terminal 10 in the sense that the phase display of a user interface for configuration requested for support starts and then receives operation for allowing phase display to start. The process of the step S30 is started in response to operation for starting phase display from this user.

The phase display module 13 executes the phase display process of a user interface based on a scenario data of the configuration phase display data. The scenario data of FIG. 5 is a scenario that sets the ring volume of the user terminal 10. This scenario is composed of three-phased image display (a basic configuration screen, a sound configuration screen, and a ring tone configuration screen). The scenario is not necessary to be composed of three phases, but the number of screen structures that are required for completion of the configuration becomes the number of phases. In this case, the message "The ring volume configuration is to be demonstrated. Please tap the screen." or the like may be displayed first on the display unit of the user terminal 10.

First, the phase display module 13 displays the basic configuration screen (Step S30). The basic configuration screen is a screen as shown in FIG. 7, for setting basic configuration such as the (wireless and network) communication configuration, the sound configuration, the mail configuration, and the application configuration or the like of the user terminal 10

On the basic configuration screen, an operation item that a user should operate may be highlighted. Specifically, as shown in FIG. 7, the scenario is "RING VOLUME CONFIGURATION", so that "SOUND CONFIGURATION 54" may be highlighted as an icon that the user should operate.

Next, the phase display module 13 shifts to waiting for operation from a user (Step S31). For example, as shown in FIG. 7, if the icon 55 is operated (Step S31: "YES"), the process proceeds to the step S32 to display a user interface of the next phase. The process is waiting otherwise until the icon 55 is operated (Step S31: "NO").

Next, as a second phase, the phase display module 13 displays the sound configuration screen (Step S32). The sound configuration screen is a screen that set configuration related to the sound of the user terminal 10 as shown in FIG. 8. When a user selects and operates the sound configuration item of the user terminal 10 on the basic configuration screen, the sound configuration screen is usually displayed. On the sound configuration screen, an operation item that a user should operate may be highlighted. Specifically, as shown in FIG. 8, the scenario is "RING VOLUME CONFIGURATION", so that "PHONE RING SOUND 57" may be highlighted as an icon that the user should operate.

Next, the phase display module 13 shifts to waiting for operation from a user again (Step S33). For example, as shown in FIG. 8, if the icon 55 is operated (Step S33: "YES"), the process proceeds to the step S34 to display a user interface of the next phase. The process is waiting otherwise until the icon 55 is operated (Step S33: "NO").

Next, as a third phase, the phase display module 13 displays the phone ring sound configuration screen (Step S34). The phone ring sound configuration screen is a screen that sets phone ring sound. A user usually operates this screen so as to change the ring volume of the user terminal 10, but this is not shown in figures. Even though configuration is actually not set to change the ring volume of the user terminal 10 at this point, the user interface for changing configuration is displayed in a phased manner until change of the configuration is completed.

The process proceeds to the next step if operation is received from a user in the steps S31 and S33. However, for example, the process may proceed to the next step after a predetermined time passes without receiving operation from a user.

Redisplay of Configuration Phase Display Data

As described above, the configuration phase display data is not be displayed on the user terminal 10 only at the time when a configuration command is sent from the support server 100, and then the configuration is executed for the user terminal 10. However, the once-received configuration phase display data may be stored in phase display image storage and may be redisplayably composed in response to display request from a user. In this case, the redisplay module 15 receives operation requested for redisplay from a user, reads out the configuration phase display data stored in the phase display image storage, and redisplays the user interface that has been displayed in a phased manner.

Screen Information Analytical Process

During the remote support process from the step S02 to S05, is executed by the user terminal 10 the screen information analytical process of FIG. 9. In other words, like the step S01, if the user terminal 10 determines that a support request has been received (Step S20: "YES"), the process proceeds to the step S21. The process is waiting otherwise until receiving support request (Step S20: "NO").

Screen information is an entire screen image that is being displayed on the user terminal 10 in principle. For example, when the screen image exists in excess of the region of the display unit of the user terminal 10 (i.e. when the region displayed by scrolling the screen of the user terminal 10 exists), the screen information includes a part in excess of the region of the display unit.

The screen information analytical module 17 of the user terminal 10 analyzes images and a character that are currently being displayed on the display unit of the user terminal 10 (Step S21). First, the screen information analytical module 17 extracts the character being displayed on the display unit.

The image ID correspondence table shown in FIG. 10 is preliminarily stored in the user terminal 10. Specifically, the image ID correspondence table is a table in which an icon image displayed on the display unit of the user terminal 10 is associated with an image ID. Referring to this image ID correspondence table, the screen information analytical module 17 determines whether or not the images that are currently displayed on the display unit include an icon image corresponding to an image ID. As a result, the screen information analytical module 17 determines the extracted character; and the image ID corresponding to the icon image that exists on the screen (Step S22).

The image ID correspondence table is stored only in the support server 100. When the screen information analytical process starts, the image ID correspondence table may be downloaded from the support server 100 to the user terminal 10 and stored in the user terminal 10.

Next, the screen information sending module 12 sends the determined image ID and character to the support server 100 (Step S23).

As an example, in the case where the screen information 62 of FIG. 11 is displayed on the display unit of the user terminal 10, the above-mentioned process will be explained. The screen information analytical module 17 extracts "CONFIGURATION", "WIRELESS AND NETWORK", and "SOUND CONFIGURATION" by retrieving the character. Then, the screen information analytical module 17 refers to the image ID correspondence table shown in FIG. 10 and determines that icon images respectively associated with the image IDs "001" and "002" exist. Finally, the screen information analytical module 17 determines the character "CONFIGURATION", "WIRELESS AND NETWORK", and "SOUND CONFIGURATION", the image IDs "001" and "002" and sends these data to the support server 100.

Figures 12, 13:
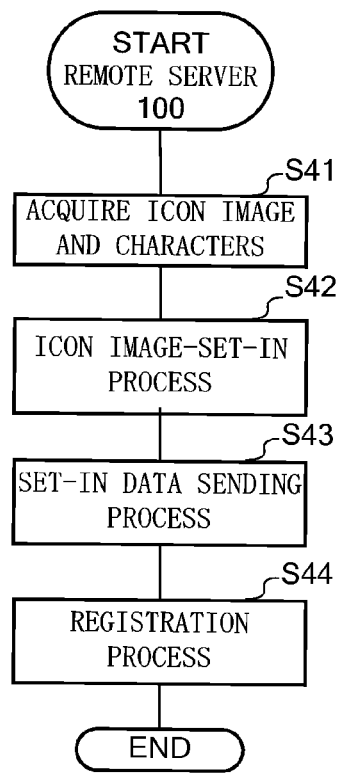
FIG. 12 illustrates an image ID-character string correspondence table.
FIG. 13 is a flow chart diagram illustrating an icon image acquisition-set-in process that is executed by the user terminal 10.

On the other hand, the screen information acquisition module 102 of the support server 100 refers to the image ID-character string correspondence table as shown FIG. 12 and determines the correspondence image data associated with the acquired image ID and character. As an example of this case, the character string "CONFIGURATION", "WIRELESS AND NETWORK", and "SOUND CONFIGURATION" are determined. In the image IDs are "001" and "002", the correspondence image data is "Sound1.png".

The correspondence data is image data corresponding to the entire screen image that is being displayed on the user terminal 10 in principle. For example, when the screen image exists in excess of the region of the display unit of the user terminal 10 (i.e. when the region displayed by scrolling the screen of the user terminal 10 exists), the image data includes a part in excess of the region of the display unit.

The terminal information output module 103 of the support server 100 displays the determined correspondence image data on the support terminal 150 in response to request from the support terminal 150. As shown in the example of FIG. 6, the same image as the screen information 62 that is being displayed in the user terminal 10 is displayed on a part of the user screen image 158 of the support terminal 150

Thus, a supporter can understand screen information that a user is viewing.

The screen information analytical process starts at the time of support request in the step S20. However, whenever screen information displayed on the display unit of the user terminal 10 is updated, the process from the step S21 to the step S23 is executed. As a result, the same image as the screen information that is being displayed on the user terminal 10 is displayed on the support terminal 150.

For the image ID correspondence table stored in the user terminal 10 and the image ID-character string correspondence table, various tables are provided with respect to each model of the user terminals 10. In other words, in the configuration information in the step S04 of the remote support process, the support server 100 acquires the model name of the user terminal 10. Then, the support server 100 refers to the image ID-character string correspondence table based on this acquired model name and determines the correspondence image data.

In the above-mentioned description, one correspondence image data has been determined from both of the character and the image ID. However, one correspondence image data may be determined from either of the character and the image ID.

When the screen information of the user terminal 10 is displayed on the support terminal 150, it is not limited to the display method using an image ID as described above. The image data that is being displayed on the user terminal 10 may be sequentially sent to the support terminal 150 by a real-time screen sharing and then displayed on the support terminal 150. In other words, because the remote operation is conducted by a command in a pseudo manner, the remote operation is not conducted in the full remote as described hereinafter. However, the support terminal 150 may share only the screen of the user terminal 10.

Icon Image Acquisition-Set-In Process

When the correspondence image data is not stored in the support server 100, the screen information that is being displayed on the user terminal 10 cannot be displayed on the support terminal 150. In addition, when an icon image that does not exist in the image ID correspondence table is being displayed on the user terminal 10, the screen information that is being displayed on the user terminal 10 cannot be displayed on the support terminal 150. Then, in the following description, a method of displaying screen information on the support terminal 150, if the correspondence image data is not stored in the support server 100, or even if an icon image that is not registered in an image ID is being displayed on the user terminal 10 will be explained with reference to FIG. 13.

The user terminal 10 may not determine the image ID in the step S22 of the screen information analytical process. Alternatively, although the user terminal 10 can determine an image ID, the image ID-character string correspondence table has no items corresponding to the determined image ID and character, so that the correspondence image data may not exist. In this case, in the step S41, the screen information acquisition module 102 of the support server 100 acquires an icon image and a character from the user terminal 10. The icon image and character are composed of the screen information of the user terminal 10. This image includes the above-described an icon image (for example, the icon images 63 and 64 of FIG. 11) that exist on the screen of the user terminal 10.

Based on the icon image and the character acquired from the user terminal 10, the terminal information output module 103 of the support server 100 sets the icon image and character in a pattern data (Step S42). This pattern data is data that is preliminarily stored in the support server 100, and is also background data in which an icon image and a character are subtracted from screen information displayed on the user terminal 10. Then, data in which the icon image and character are set in the pattern data is sent to the support terminal 150 (Step S43). The support terminal 150 receives this set-in data and displays it as pseudo screen information of the user terminal 10.

Finally, the registration module 105 of the support server 100 assigns a new image ID to the icon image that has been acquired from the user terminal 10 at this time, associates the image ID and the icon image with data for determining the model name, and registers this information (Step S44). The acquisition of data for determining the model name is described hereinafter. Accordingly, the image ID correspondence table can be updated by adding the icon image and the image ID that have not been registered until now. The set-in data may be correspondence image data.

If it takes time to acquire the image, giving speed priority, only character may be acquired from the user terminal 10 and set in the pattern data. In this case, a supporter can infer the screen information that has been displayed in the user terminal 10 from the character.

Correspondence image data in the image ID-character string correspondence table is not stored in the support server 100, so that the screen information that is being displayed on the user terminal 10 cannot be displayed on the support terminal 150. Accordingly, the method of displaying screen information even if the correspondence image data is not stored in the support server 100 will be described hereinafter.

In acquisition of the configuration information of the remote support process, the data acquisition module 101 of the support server 100 acquires data for determining the model name of the user terminal 10. The data for determining the model name may be a serial number, a MAC address, the ID number of a subscriber identity module card (hereinafter referred to as "SIM") card, a phone number, or the like. Then, it is determined whether or not this model is a model registered in the support server 100 based on the data for determining the model name (Step S40). If it is registered (Step S40: "YES"), the above-mentioned process is executed. If it is not registered otherwise (Step S40: "NO"), the process from the step S41 is executed. The step S40 is not shown in FIG. 3. The process from the step S41 is conducted in a similar way to that shown in FIG. 3.

In the step S44, the registration module 105 of the support server 100 assigns the image ID to the icon image that has been acquired from the user terminal 10 at this time, the icon image and the image ID are associated with data for determining the model name, and registers this information. Accordingly, the image ID correspondence table can be updated, and the model name is no longer new next time. Since the image ID is assigned, not sending and receiving of the icon image itself but processing with the image ID enables high-speed processing.

Switching-Over Process to Full Remote System

The remote support process (quick remote) as described with reference to FIG. 3 can reduce the load of the data transfer process and conduct the support process at high speed, using a configuration command and an image ID. However, there are requests of a supporter side that screen information being displayed on the user terminal 10 can be viewed directly on the support terminal 150 and that full remote operation can be conducted for the screen directly.

The full remote system is a remote system that conducts a remote service by sequentially sharing screens between terminals. In other words, the screen shot that is being displayed on the user terminal 10 is constantly sent to the support terminal 150 and displayed thereon. Then, the remote operation input from the support terminal 150 is sequentially reflected as operation input of the user terminal 10. In this case, the convenience is improved in that operation conducted by a supporter for the user terminal 10 can be checked. However, the screen shots of screen information displayed on the user terminal 10 needs to be sequentially displayed on the support terminal 150, and the remote operation needs to be reflected in the displayed screen. Thus, there is a problem of increase of throughput of the entire system including the support server 100 and the data traffic.

To solve this problem, the remote support process to the user terminal 10 promptly starts using the quick remote when remote support starts and then switches from the quick remote to the full remote at the time when the full remote is ready. This process will be explained hereinafter.

To execute the full remote system, the user terminal 10 is provided with the screen information sending module 18 that sequentially sends image data of the screen shot that is being displayed on the screen of the user terminal 10 to the support server 100

On the other hand, the support server 100 is provided with the screen information forwarding module 107 that receives image data sent from the user terminal 10 and forwards the image data to the support terminal 150.

In the remote support process of FIG. 3, in the step S01, when the user terminal 10 receives support request from a user, the screen information sending module 18 starts. On the other hand, when the support server 100 receives notification of support request from the user terminal 10, executes the process from the step S02, and starts the screen information forwarding module 107.

When the screen information forwarding module 107 starts but actually does not receive image data from the screen information sending module 18, the screen information forwarding module 107 cannot forward the image to the support terminal 150. Even when the screen information forwarding module 107 receives image data from the user terminal 10, the screen information forwarding module 107 forwards the received image data to the support terminal since image data is sequentially sent from the user terminal 10. Thus, comfortable full remote service cannot be provided. For this reason, the screen information forwarding module 107 receives image data from the user terminal 10, the image data can be sent to the support terminal 150, and checks whether or not the support terminal 150 displays the image data that has sequentially been received. It may be defined that the full remote is ready at the time when the communication band among the user terminal 10, the support server 100, and the support terminal 150 has secured a predetermined capacity.

It often takes a time to start the full remote service due to conduct of such check. Thus, the quick remote described with reference to FIG. 3 doesn't often take a time for such preparation, so that generally a remote support starts before the full remote.

Figure 14:
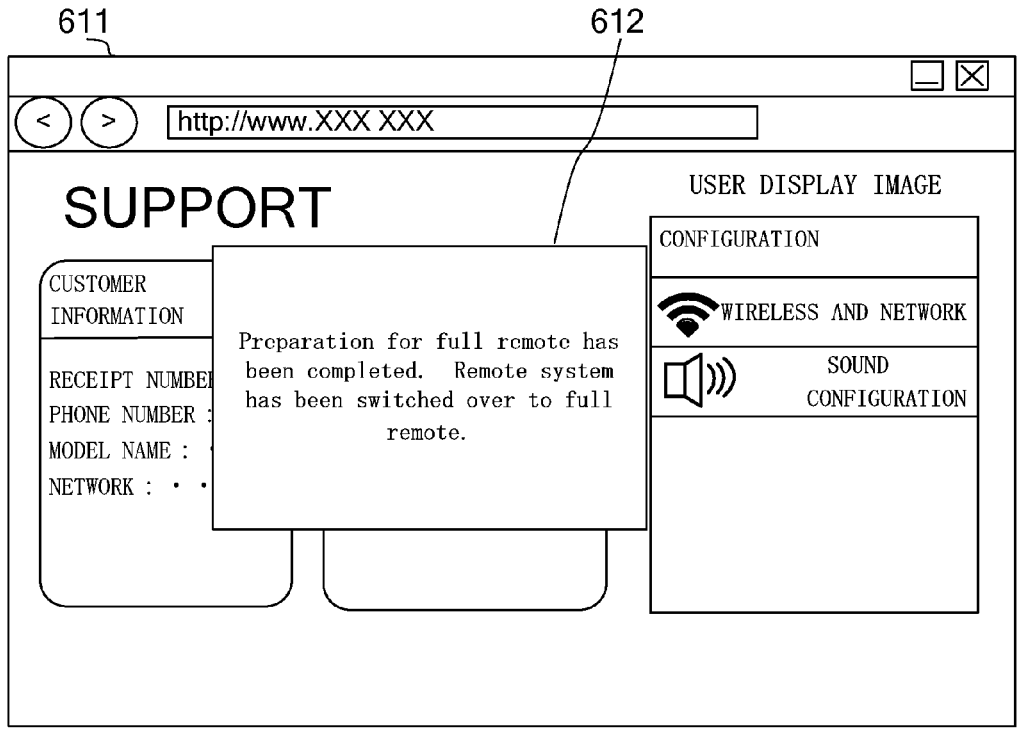
FIG. 14 is a screen image (full remote switched over message) displayed on the support terminal 150.

At a predetermined time after remote support by the quick remote started, the quick remote is stopped and the full remote provides a remote service. This predetermined time may be time when the full remote is ready as described above. Specifically, the command sending module 104 used in the quick remote is automatically stopped at the time when the full remote is ready. Then, the user terminal 10 and the support terminal 150 starts screen sharing in real time, and the shared screen of the user terminal 10 is displayed on the user screen image 158 of the support terminal 150. For remote operation, the full remote starts to receive operation. As shown in FIG. 14, a message for informing switching over to the remote support to a supporter may be displayed.

For example, the quick remote may be automatically switched over to the full remote when the capacity of the communication band is sufficient. In this situation when the user terminal 10 is moved or the like, and then the capacity of the communication band becomes insufficient, the full remote may be switched over to the quick remote.

Logging Process for Private Information

In the user terminal 10, data of the private information such an address book and of trade secrets in business is stored. For this reason, in the remote support process, the data of this private information and the trade secrets may be improperly manipulated through remote operation from the support terminal 150 to the user terminal 10. Even if the manipulation is not intended, a supporter may make a mistake in operation, so that the supporter may delete applications and data that are stored in the user terminal 10.

Figure 15:
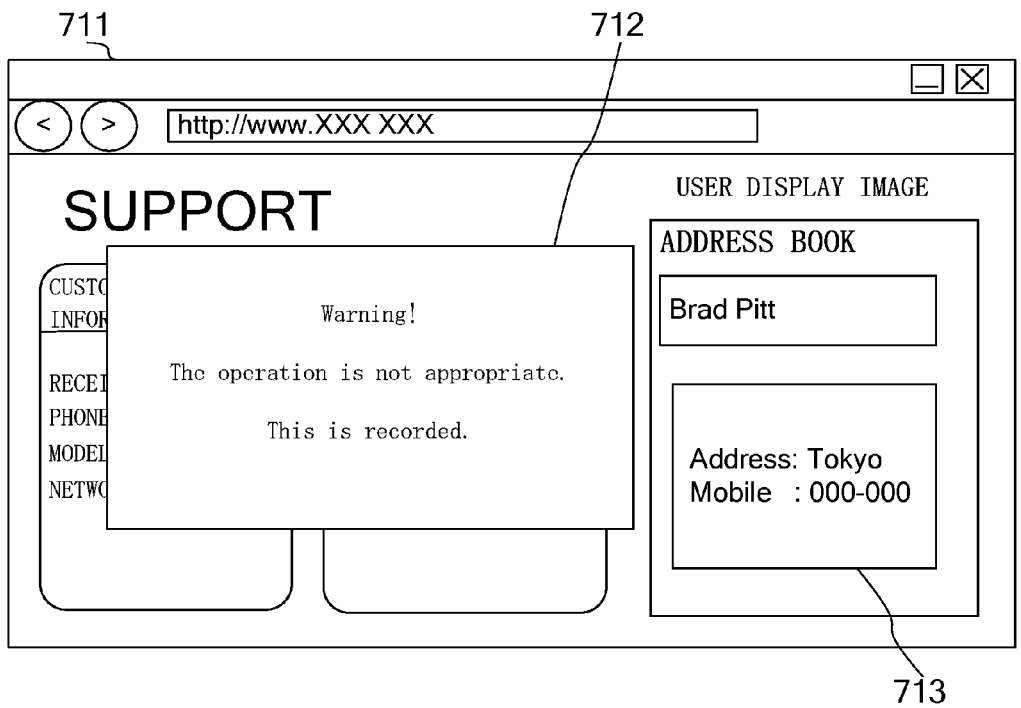
FIG. 15 illustrates a screen image (a message during logging) displayed on the support terminal 150.

For this reason, data (an address book and the like are distinguished with by extension) to be restricted preliminarily for operation from the support terminal 150 to the user terminal 10; and prohibited operation items (not to allow the operation of data "deletion" and the like) should be stored in the support server 100 or the support terminal 150. When a supporter conducts the operation (view or edit) to prohibited data or conducts prohibited operation, the support server 100 or the support terminal 150 detects this, and the logging module 153 of the support server 100 or the support terminal 150 logs this operation as a log. As shown in FIG. 15, when the prohibited operation is conducted (an address book 713 is viewed), an alert message 712 may be displayed on the support terminal 150.

In the quick remote, when the above-mentioned prohibited operation is conducted, it is effective not to generate a configuration command (but not limited to configuration) (Step S07) so as not to conduct command operation based on the operation, in addition to logging.

To achieve the means and functions as described above, a computer (including a CPU, an information processor, and various terminals) reads and executes a predetermined program. For example, a program is provided in forms recorded in a computer-readable record medium such as a flexible disk, a CD (CD-ROM etc.), and a DVD (a DVD-ROM and a DVD-RAM, etc.). In this case, a computer reads a program from a record medium, forwards the program to internal or external storage to store the program therein, and executes the program. For example, the program may be preliminarily recorded in a memory device (a record media) such as a magnetic disk, an optical disk, and a magnetic optical disk, and then provided from the memory device to a computer through a communication line.

The present invention is not what it limits it to these embodiments mentioned above though it explained the embodiment of the present invention. Moreover, it doesn't pass, and the effect of the present invention is not an enumeration of the most suitable effect causing from the present invention in the effect described in the embodiment of the present invention limited to the one described in the embodiment of the present invention.

REFERENCE SIGNS LIST

1 quick remote system
3 public line network
10 user terminal
100 support server
150 support terminal

The invention claimed is:

1. A remote system comprising:
a terminal;
a remote terminal remotely supporting the terminal;
and a support server;
wherein the support server includes:
a configuration information acquisition module acquiring software or hardware configuration information in response to a support request from the terminal, the software or hardware configuration information being stored in the terminal, and notifying the remote terminal,
the remote terminal includes:
an operation receiving module receiving a remote operation from a remote supporter, the remote operation corresponding to the support request sent from the terminal, and sending the remote operation to the remote server,
the support server also includes:
a command sending module sending the remote operation received from the remote supporter to the terminal, as a command for conducting operation corresponding to the support request from the terminal,
and the terminal includes:
a phase display module displaying a user interface to help a user who operates the terminal to conduct operation corresponding to the support request by her or himself in a phased manner on the terminal, where the remote operation corresponding to the support request is reflected in the terminal based on a command sent from the command sending module;
wherein the support request is a request for assistance in performing an operation on the terminal by a user of the terminal, wherein the operation received from the supporter comprises a response to the support request,
wherein the configuration command comprises a command to change a configuration file on the terminal to effect a configuration change specified by the support request,
wherein displaying the user interface in a phased manner includes displaying on the terminal a series of screens for guiding the user of the terminal through multiple steps to perform the operation specified in the support request;
analyzing a screen displayed on the terminal;
identifying an icon displayed on the screen on the terminal;
matching the identified icon with an image ID; sending the image ID to the support server;
generating a rendition of the screen displayed on the terminal at the support server based on the image ID;
and sending the rendition of the screen displayed on the terminal to the support terminal so as to provide the support terminal with the rendition of the screen on the terminal without having to transmit complete screen data from the terminal to the support terminal.

2. The remote system according to claim 1, wherein the remote server further includes a screen information acquisition module acquiring at least one of an image ID and a character string from the terminal, the image ID and the character string, both corresponding to screen information of the terminal; and
a terminal information output module displaying an image corresponding to at least one of the acquired image ID and the acquired character string on the remote terminal.

3. A support system comprising: a terminal;
a support terminal supporting the terminal;
and a support server;
wherein the support server includes:
a configuration information acquisition module acquiring software or hardware configuration information on the terminal in response to a support request sent from the terminal,
the support terminal includes:
a configuration operation receiving module receiving operation from a supporter, the operation corresponding to the support request sent from the terminal,
the support server also includes:
a command sending module sending the operation received from the supporter to the terminal, as a configuration command for setting configuration corresponding to the support request sent from the terminal,
and the terminal includes:
a configuration phase display module displaying a user interface to set configuration corresponding to the support request in a phased manner on the terminal, where the configuration corresponding to the support request is conducted based on the configuration command sent from the command sending module;
wherein the support request is a request for assistance in performing an operation on the terminal by a user of the terminal, wherein the operation received from the supporter comprises a response to the support request,
wherein the configuration command comprises a command to change a configuration file on the terminal to effect a configuration change specified by the support request,
wherein displaying the user interface in a phased manner includes displaying on the terminal a series of screens for guiding the user of the terminal through multiple steps to perform the operation specified in the support request;

analyzing a screen displayed on the terminal;

identifying an icon displayed on the screen on the terminal;

matching the identified icon with an image ID;

sending the image ID to the support server;

generating a rendition of the screen displayed on the terminal at the support server based on the image ID;

and sending the rendition of the screen displayed on the terminal to the support terminal so as to provide the support terminal with the rendition of the screen on the terminal without having to transmit complete screen data from the terminal to the support terminal.

4. The support system according to claim 3, wherein the support server includes a screen information acquisition module acquiring at least one of an image ID and a character string from the terminal, the image ID and the character string, both corresponding to screen information of the terminal and a terminal information output module displaying an image corresponding to at least one of the image ID and the character string on the support terminal.

5. The support system according to claim 3, wherein the configuration phase display module includes a redisplay module redisplaying the user interface that was displayed in a phased manner in response to user's operation of the terminal.

6. A support method executed by a support system comprising: a terminal;
a support terminal supporting the terminal;
and a support server;
the method comprising:
wherein the support server executes the step of:
acquiring software or hardware configuration information on the terminal in response to a support request from the terminal;
the support terminal executes the step of:
receiving an operation from a supporter corresponding to the support request from the terminal;
the support server executes the step of:
sending operation received from the supporter to the terminal, as a configuration command for setting configuration corresponding to the support request from the terminal;
the terminal executes the step of:
displaying a user interface to set configuration corresponding to the support request, in a phased manner on the terminal, where configuration corresponding to the support request is conducted based on the configuration command;

wherein the support request is a request for assistance in performing an operation on the terminal by a user of the terminal, wherein the operation received from the supporter comprises a response to the support request, wherein the configuration command comprises a command to change a configuration file on the terminal to effect a configuration change specified by the support request, wherein displaying the user interface in a phased manner includes displaying on the terminal a series of screens for guiding the user of the terminal through multiple steps to perform the operation specified in the support request;

analyzing a screen displayed on the terminal;

identifying an icon displayed on the screen on the terminal;

matching the identified icon with an image ID;

sending the image ID to the support server;

generating a rendition of the screen displayed on the terminal at the support server based on the image ID;

and sending the rendition of the screen displayed on the terminal to the support terminal so as to provide the support terminal with the rendition of the screen on the terminal without having to transmit complete screen data from the terminal to the support terminal.

7. The support method of claim 6, wherein displaying the user interface in a phased manner further includes:
waiting for user input to the terminal between different screens of the series of screens; and
proceeding to subsequent screens of the series of screens in response to receipt of user input to the terminal.

8. The support method of claim 6, wherein displaying the user interface in a phased manner further includes automatically proceeding to subsequent screens of the series of screens after a predetermined time passes without receiving input from the user.

9. The support method of claim 6, further comprising: after sending the rendition of the screen to the support terminal, transitioning to a screen sharing mode wherein the support terminal displays a full screen image of the screen on the terminal.

* * * * *